(12) United States Patent
Harris

(10) Patent No.: US 11,622,249 B1
(45) Date of Patent: Apr. 4, 2023

(54) VEHICLE SYSTEM FOR SHARING INFORMATION AMONG SMART VEHICLES

(71) Applicant: Scott C Harris, San Diego, CA (US)

(72) Inventor: Scott C Harris, San Diego, CA (US)

( * ) Notice: Subject to any disclaimer, the term of this patent is extended or adjusted under 35 U.S.C. 154(b) by 0 days.

(21) Appl. No.: 17/654,582

(22) Filed: Mar. 12, 2022

(51) Int. Cl.
*H04W 4/46* (2018.01)
*B60W 60/00* (2020.01)
*B60W 50/00* (2006.01)
*H04L 9/32* (2006.01)

(52) U.S. Cl.
CPC .......... *H04W 4/46* (2018.02); *B60W 50/0097* (2013.01); *B60W 60/001* (2020.02); *H04L 9/3247* (2013.01); *B60W 2556/10* (2020.02); *B60W 2556/20* (2020.02); *B60W 2556/65* (2020.02)

(58) Field of Classification Search
CPC .. H04W 4/46; B60W 60/001; B60W 50/0097; B60W 2556/10; B60W 2556/20; B60W 2556/65; H04L 9/3247; G01C 21/3691; G01C 21/3822; G01C 21/3889; G08G 1/0112; G08G 1/0116; G08G 1/0133; G08G 1/0141; G08G 1/096708; G08G 1/096725; G08G 1/096783; G08G 1/096791

See application file for complete search history.

(56) References Cited

U.S. PATENT DOCUMENTS

| | | | |
|---|---|---|---|
| 2017/0010115 A1* | 1/2017 | Stein | G01C 21/3691 |
| 2017/0010124 A1* | 1/2017 | Reisman | G05D 1/0219 |
| 2020/0014759 A1* | 1/2020 | Wunderlich | G06Q 10/20 |
| 2021/0107537 A1* | 4/2021 | Ross | B61L 25/025 |
| 2021/0284196 A1* | 9/2021 | Sorensen | G06Q 30/0645 |
| 2021/0295687 A1* | 9/2021 | Salles | G08G 1/09675 |

* cited by examiner

Primary Examiner — Orlando Bousono

(57) ABSTRACT

A smart car system that exchanges information between different vehicles. An embodiment exchanges information one for the other. Another embodiment determines or sends information from one vehicle to the other, and then receives information from a different vehicle and keeps a score of a ratio between the amount of information that is set in an amount of information received. The information is checked for trust.

11 Claims, 3 Drawing Sheets

VEHICLE SYSTEM FOR SHARING INFORMATION AMONG SMART VEHICLES

BACKGROUND

Modern vehicles, referred to herein as "smart cars", have cameras, sensors, and computers, that can detect and sometimes protect against, collisions and other dangers. Such smart cars can use their processing capability to determine danger, for example such as another car or an obstacle, and automatically brake or turn or take some other action to protect the vehicle occupants. The detection of danger is typically based on the sensors in the smart car, such as cameras, detecting such an obstacle.

These kinds of smart cars can also take actions to drive themselves.

Certain experimental smart cars may have cameras and other sensors which are mounted on extending arms, so that the cameras can see and sense over a long distance.

However, many commercial automobiles will often have cameras which are contoured into the different areas on the automobile so that the cameras are not easily seen, and thus do not detract from the look of the automobile.

Because of these constraints, it is often difficult for the cameras and other sensors to see long distances ahead of the vehicle, or around certain kinds of corners.

SUMMARY

An embodiment describes techniques of sharing data among different smart vehicles, e.g., smart cars.

A first embodiment describes an exchange of data information between smart cars, each of which sees all some part of the environment which might be helpful to the other smart car which is in a different location.

Another embodiment describes forming a rating for different cars, and allowing the cars to send and receive information, according to their rating, as an information exchange.

Another embodiment describes verification or trusting of the information received from other vehicles.

BRIEF DESCRIPTION OF THE DRAWINGS

These and other aspects will now be described with reference to the accompanying drawings wherein.

The Drawings show aspects of the invention, and specifically.

DETAILED DESCRIPTION

Figure 1:
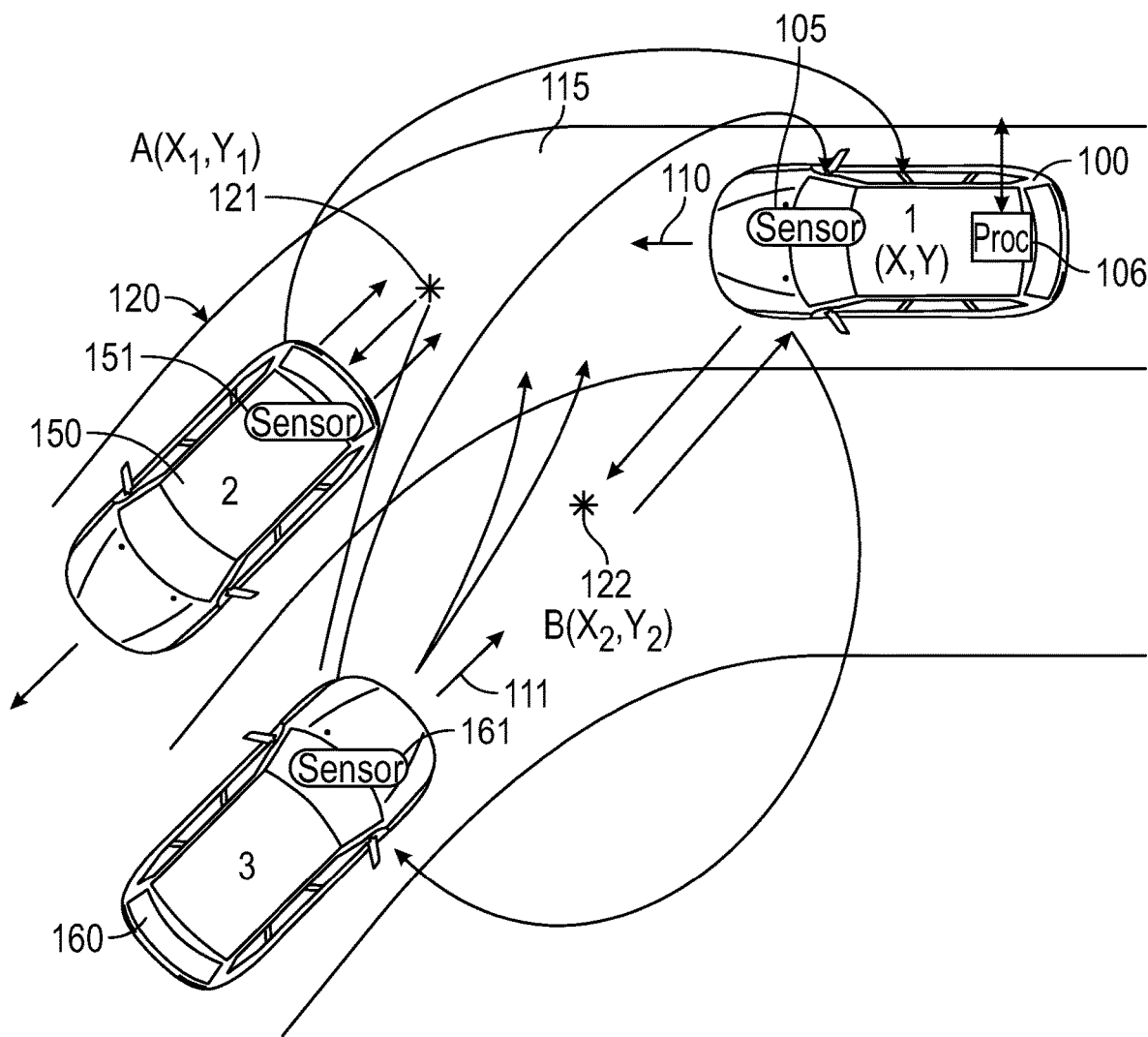
FIG. 1 shows a number of vehicles along the path.

An embodiment is shown in FIG. 1. A number of smart vehicles have sensors installed. Each vehicle can send and receive information via wifi, or cellular or over some other channel. A vehicle such as 100 includes at least one sensor 105. The sensor 105 can be a camera, radar, lidar, or any other system that is capable of sensing road conditions of any type in any format. While the vehicles are shown with one sensor, more typically there would be multiple sensors, on front, rear, side and other locations on the vehicle.

The vehicles each have a computer that uses information from their sensors to carry out navigation of the vehicle, such as for example self driving, safety operations, and other operations.

Car number 1, shown as 100, is traveling in the direction of the arrow 110 on the road 115. In order to continue traveling on the road 115, the car 100 needs to know what is ahead on the road. However, it can only see those things which are in the range of its sensors 105. For example, if the sensors are located on the front grill of the car or side door of the car, rather than above the car and extending out from the car, the sensor may not be able to view the portion of the road shown as 120, because of the curve in the road or the distance from the road. Therefore, the system either runs with less than perfect information, or cannot accurately see that portion of road.

In this embodiment, however, there are other vehicles, car number 2, shown as 150, and car number 3, traveling in the opposite direction 111, shown as 160. These cars also have sensors, car 150 includes sensor 151, car 160 includes sensor 161.

Car 1 (100) wants to view the point A/location 120 where it is heading. That may be too far ahead of car 1, however. The sensor 151 in car 2 (150) can easily see the position a area 121, because it is right behind the car 2. In a similar way, the sensor 161 on car 3 can easily see the portion a of the road. The car 160, wants to see the portion of the road B, shown as 122. The sensor 161 might or might not be able to see the section B, but the sensor 105 on the car 100 can certainly see that location.

The inventor recognizes that exchange of information between these vehicles can provide additional information to the vehicles that would not otherwise be provided.

Figure 2:
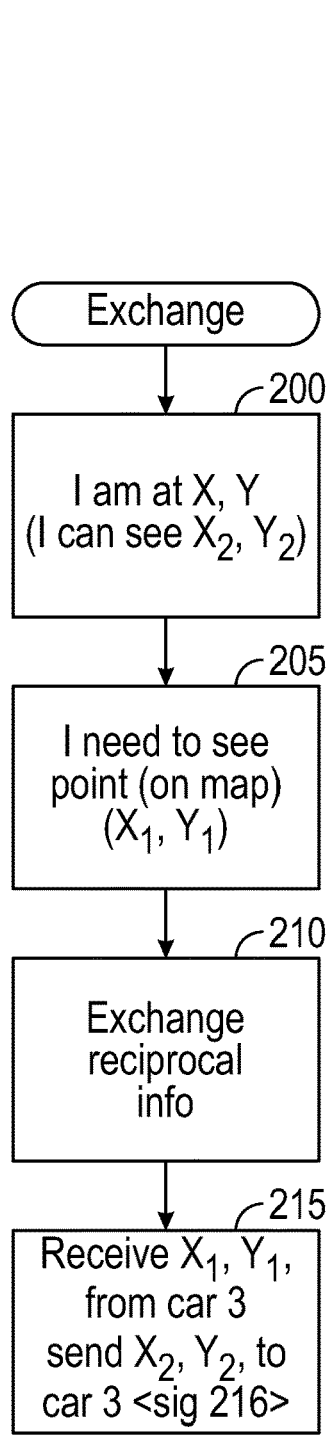
FIG. 2 shows a flowchart of information exchange.

An embodiment shown in FIG. 2 is an information exchange embodiment. From the point of view of vehicle 100, this information exchange embodiment starts out by sending a message at least to close vehicles. The message can include for example the location of vehicle 100 in longitude and latitude, or can include information about the part of the road that the vehicle 100 is on or the part of the road that the vehicle 100 wants to see. In an embodiment, vehicle 100 starts out by messaging, at 200, that it is at point x,y. Vehicle 100 can also indicate that it can see a certain area, which can for example be a range of points $x_z$, $y_z$. At 205, vehicle 100 indicates that it needs to see the area on the map at $x_1$, $y_1$, point 121 in FIG. 1. This is a point around the bend which the vehicle 100 knows that it cannot see.

At 210, car 3 has received this information, and realizes that it can see the point $x_1$, $y_1$, and that car 1 can also see $x_2$, $y_2$, point number 122. Therefore, they have reciprocal information that can be exchanged.

At 210, the vehicles have received information that they each have information that the other vehicle can use.

At 215, the cars exchange that reciprocal information. 210 represents getting the information from car 3 which has the reciprocal information and 215 indicates sending the information about $x_2$, $y_2$ to 2 car 3. In other words, the cars find through their operations that they each have data the other can use, and proceed to exchange that data.

The exchanged messages can include a cryptographic signature 216.

In embodiments, the points X and Y can be longitude and latitude, but they can alternatively be any kind of data in any kind of coordinate system, e.g, a Cartesian coordinate system. The data which is sent/exchanged can be real time images, real-time video, or any kind of vectorized information such as a feature vector that represents a processed version of an image, or an array of data points. The term images and video is intended to include images or videos formed from radar, lidar, or any other kind of sensor information. The information about the current surroundings is referred to herein generically as PV data.

In the FIG. 2 embodiment, the two cars figure out that they each have information that the other needs and then they exchange it.

Figure 3:
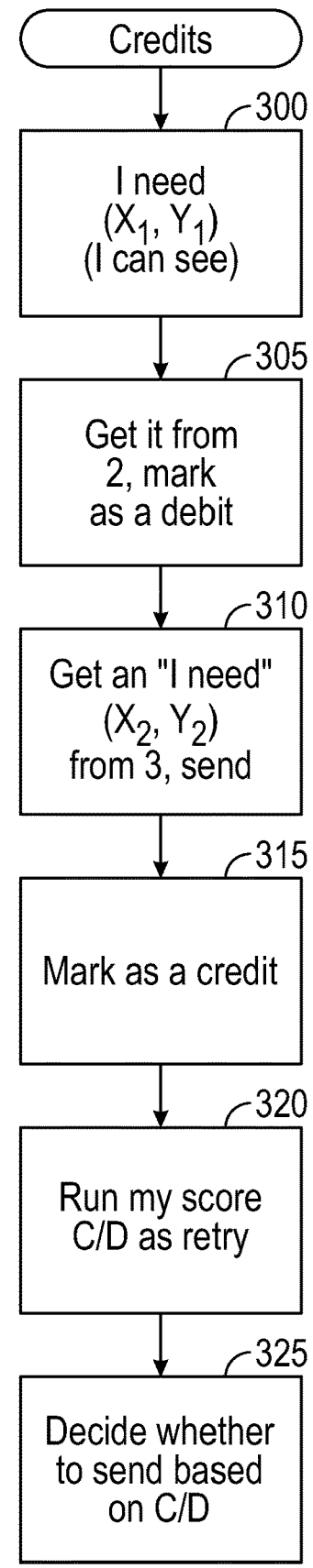
FIG. 3 shows a flowchart of a credit and debit system.

FIG. 3 defines a system, referred to herein as a credit system. In the credit system of FIG. 3, car 1 at 300 broadcasts that it needs information about $x_1$, $y_1$, and that it can see $x_z$, $y_z$. However, in the credit system of FIG. 3, there is not necessarily an automatic exchange of information, but rather a credit and debit system that keeps track of how much information has been sent by each vehicle, e.g. the first vehicle and how much information has been received by the first vehicle.

The data which is needed at 305 is received from car 2 (150), and then marked as a debit against car 1 which has received data from car 2 but has not returned any data in return. At 310, however, car 1 (100) receives an "I need $x_2$, $y_2$" from car 3. Car one can see $x_2$, $y_2$, and sends that data to car 3. Car 3 has not sent anything to car one, so this is marked in the global system as a credit against the debit that car 3 previously incurred. At 320, a running score between credits and debits is used to form a rating. The rating of 1.0 might mean that car one has sent as many credits as it has received. A credit of less than one means that car one is receiving more information than it is sending; conversely a credit of more than one indicates that car one is sending more than it is receiving.

325 shows that the vehicle can decide whether to send to another vehicle, based on the credit/debit rating. For example user may set parameters indicating that it should only send to vehicles having a score greater than 0.7. In this way, A higher-rated car may be more likely to receive information than a lower rated car.

The above describes sending real-time information, for example what is at point $x_2$, $y_2$ at the current moment. However, the information sent can also be aged information, which can be for example used by the car as a data point, since if it sees an obstruction in the road, that obstruction may have moved, or may still be there, and consequently information that is 15 to 30 seconds old is still useful, information that is a minute old is also useful, and other more aged information may also be useful. So all of this data can be used in this way.

In one embodiment, the vehicles can simply exchange information. It is likely that when such vehicles exchange this kind of information, that they are either the same brand or have some kind of hardware in common. However, the system described herein contemplates and information exchange and credit system. The vehicles communicate using an exchange system, crediting either exchanging data with one another, or crediting data for one another.

Each of the vehicles includes a processor, shown in vehicle 100 as processor 106. This processor is continually processing data and information from received from the sensors, in order to calculate how to proceed on the road. This can be done to eat carry out self driving, or can be done as a safety check, for example.

Once the vehicle receives the information, another question becomes how much can the vehicle trust the information that it has received. Another embodiment describes different techniques to enable trust of the information received in this way.

In one embodiment, when an image or video is set, such as at 215, it includes a signature, shown as 216, which can be a cryptographic signature that cryptographically verifies that the information has been received from a specific sender. Techniques described herein enable determining whether a specific sender should be trusted, or not trusted.

Figure 5:
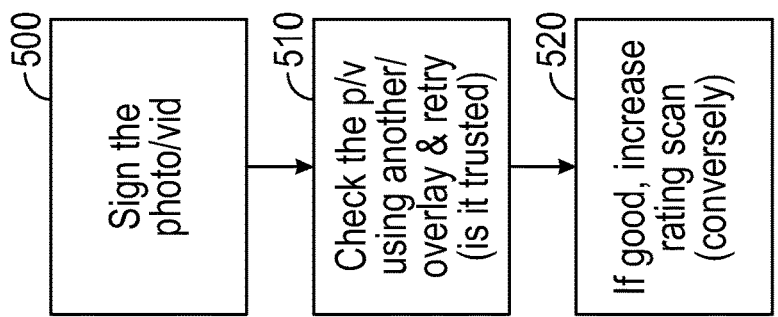
FIG. 5 shows a flowchart of operation of verifying the images.

FIG. 5 illustrates the operation of signing the photo or video (or other information) which is sent. The signature can be a digital signature of any kind including a hash, or any other kind of signature. The signature is preferably cryptographically verifiable. Once the PV data has been received, it is checked by the receiver.

Figure 4:
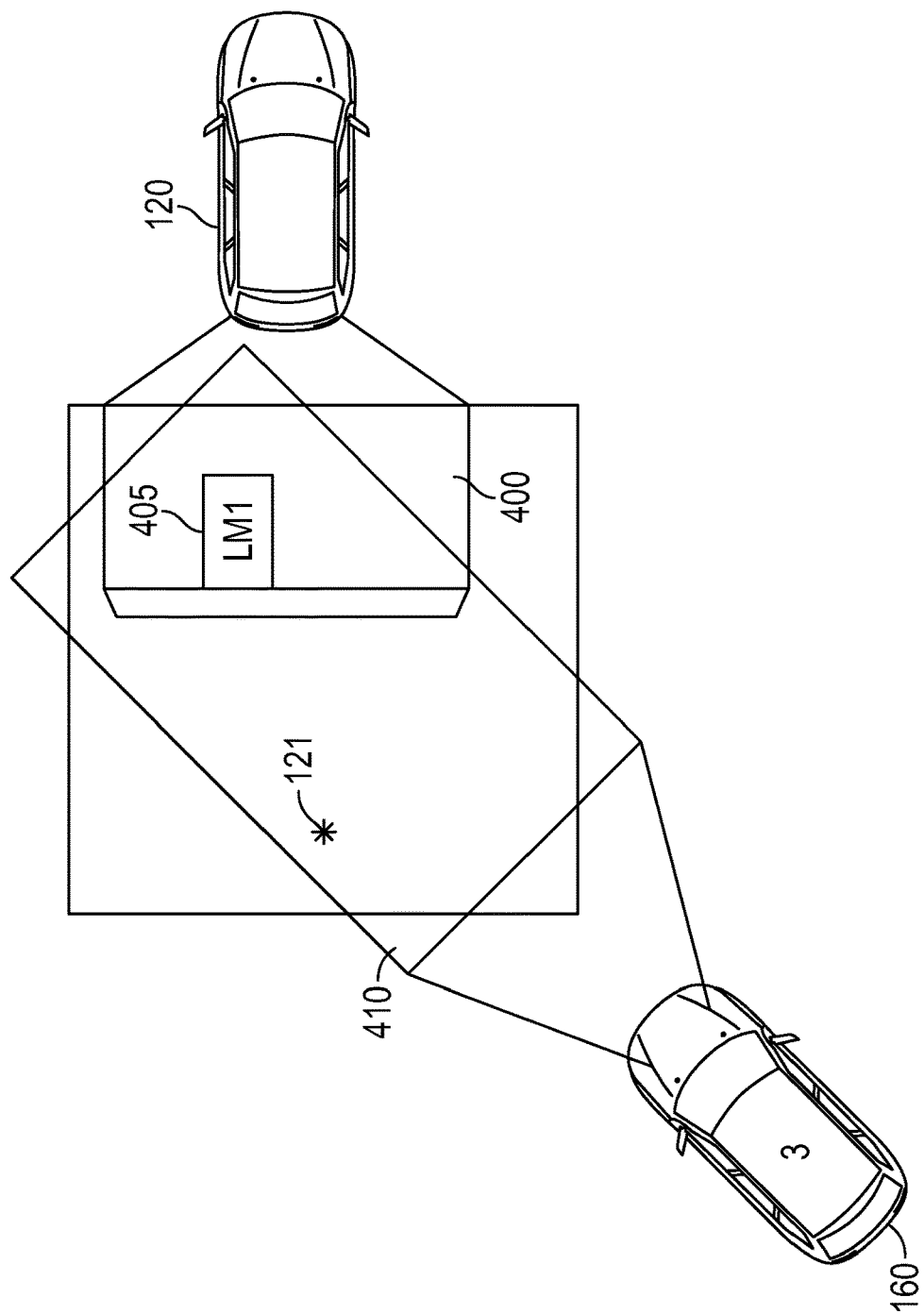
FIG. 4 shows a system of verifying images.

The PV can be checked using the overlay system in FIG. 4. FIG. 4 illustrates how the car number 1, 100, to view a first area 400. Within that first area 400 is a landmark shown as landmark number 1, shown as 405. The car cannot view beyond the edge of area 400, and hence cannot view the desired point or area shown as 121. Car 3, element 160, however, is viewing the area 121, and also viewing the landmark 1, by viewing the area 410. This means that there is an overlap between what the same things that can be viewed. Landmark one can be for example another car, trees, street sign, or any desired thing.

The PV is also checked using the rating of the signer. The rating indicates whether the signer has been trusted, using a distributed system that distributes the determination of how much the signer can be trusted.

At 520, the PV turns out to be good and accurate, the rating of the sender can be increased. Conversely, if there is a problem with the photo, for instance it is hacked or spoofed or old, the rating of the sender can be decreased.

The sender rating can be stored as part of a distributed ledger stored by many different parties, or verified in some other trusted way.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising
   a plurality of sensors, which operate to determine current conditions around a first vehicle and creates information indicating the current conditions;
   a computer which uses the information to carry out automated navigation of the first vehicle,
   the computer operating to determine a first location along a future path of the first vehicle, that cannot be viewed by the plurality of sensors in the first vehicle,
   the computer sending a message to at least one other vehicle requesting first information about the first location;
   the computer receiving the first information about the first location from the at least one other vehicle;
   the computer also sending second information from the plurality of sensors about a second location around the first vehicle, to a second vehicle.

2. The system as in claim 1, wherein the at least one other vehicle and the second vehicle are the same vehicle, and where the computer causes the information to be exchanged, where the computer causes the second information about the second location to be sent from the first vehicle to the second vehicle, and where the computer receives the first information about the first location, sent from the second vehicle to the first vehicle.

3. The system as in claim 1, further comprising maintaining a score indicating how much information has been sent by the first vehicle to other vehicles and how much information has been received from the other vehicles by the first vehicle.

4. The system as in claim 3, wherein the at least one other vehicle and the second vehicle are different vehicles,
where the computer causes the information about the second location to be sent from the first vehicle to the second vehicle, and where the computer receives information about the first location, sent from the at least one other vehicle to the first vehicle.

5. The system as in claim 1, wherein the information is one of images or video.

6. The system as in claim 1, wherein the information is real time information representing a current information about a location in real time.

7. The system as in claim 1, wherein the information is aged information indicating a condition of a location at a certain time previous to a current time.

8. The system as in claim 1, wherein the information includes a cryptographic signature, and the first vehicle uses its computer to determine whether a specific sender of information can be trusted using the cryptographic signature.

9. The system as in claim 1, wherein the computer overlays information received from the at least one other vehicle against information received by the first vehicle, and determines whether to trust the information based on overlaying the information indicating the current conditions received from the at least one other vehicle with the information received by the first vehicle.

10. The system as in claim 9, wherein the computer analyzes for specific landmarks in the information received by the first vehicle, and looks for the same landmarks in the information received from the at least one other vehicle.

11. The system as in claim 1, wherein the computer checks a rating of a sender of the information and determines whether the sender can be trusted using the rating.

* * * * *